(12) United States Patent
McWilliams

(10) Patent No.: US 11,427,262 B1
(45) Date of Patent: Aug. 30, 2022

(54) MODULAR TRAILER SYSTEM

(71) Applicant: Clifford O. McWilliams, Owasso, OK (US)

(72) Inventor: Clifford O. McWilliams, Owasso, OK (US)

( * ) Notice: Subject to any disclaimer, the term of this patent is extended or adjusted under 35 U.S.C. 154(b) by 0 days.

(21) Appl. No.: 17/577,125

(22) Filed: Jan. 17, 2022

(51) Int. Cl.
| | |
|---|---|
| *B62D 33/02* | (2006.01) |
| *B62D 29/00* | (2006.01) |
| *B62D 53/06* | (2006.01) |
| *B62D 63/06* | (2006.01) |

(52) U.S. Cl.
CPC ........... *B62D 33/02* (2013.01); *B62D 29/007* (2013.01); *B62D 29/008* (2013.01); *B62D 53/06* (2013.01); *B62D 63/06* (2013.01)

(58) Field of Classification Search
CPC ................ B62D 25/02; B62D 25/2036; B62D 25/2054; B62D 33/044; B62D 33/046; B62D 33/02; B62D 33/023; B62D 29/045; B62D 29/007; B62D 29/008; B62D 63/06; B62D 63/08; B62D 53/06; B61D 5/002; B61D 5/06; B61D 9/00; B61D 9/06; B61D 17/06; B60P 1/286
USPC ................... 296/183.1, 186.1; D12/102, 105
See application file for complete search history.

(56) References Cited

U.S. PATENT DOCUMENTS

| | | |
|---|---|---|
| 1,627,336 A | 11/1926 | Nelson |
| 1,883,936 A | 8/1929 | Kerr |
| D132,903 S | 12/1940 | Biszantz |
| D187,020 S | 1/1960 | Hockensmith, Jr. |
| 3,094,351 A | 6/1963 | Gwinn, Jr. |
| 3,729,230 A | 4/1973 | Tomlinson, Jr. et al. |
| D289,748 S | 5/1987 | Proeschl |
| 4,883,321 A | 11/1989 | Voigt |
| 5,083,826 A | 1/1992 | McCrary |
| 5,460,431 A | 10/1995 | McWilliams |
| D390,166 S | 2/1998 | Kass et al. |
| 6,539,631 B1 | 4/2003 | McWilliams |

(Continued)

OTHER PUBLICATIONS

PT United Tractors Pandu Engineering, "Rear Dump Tipper Semi Trailer"; http://www.patria.co.id/?act-products&show-c_43f546bdcdfe9&do-p_444378cef1621; May 18, 2012.

(Continued)

*Primary Examiner* — Gregory A Blankenship
(74) *Attorney, Agent, or Firm* — Head, Johnson, Kachigian & Wilkinson, PC

(57) ABSTRACT

A modular trailer system comprising a plurality of curved panels, where each panel is elongate and has a first side with an angled projection and an opposing second side with an angled slot such that the angled projection of one panel is capable of fitting into the angled slot of another panel, allowing the panels to join together to form a continuously curved surface. The modular trailer system may further comprise a first top rail with an angled slot capable of receiving the angled projection of one of the plurality of curved panels and a second top rail with an angled projection capable of fitting into the angled slot of another of the plurality of curved panels. The plurality of curved panels, first top rail, and second top rail may be assembled together to form an elongate trailer body with a partially circular cross section, such that the trailer body has a continually rounded bottom and sides and an open top.

10 Claims, 5 Drawing Sheets

(56) References Cited

U.S. PATENT DOCUMENTS

| | | | |
|---|---|---|---|
| 6,637,808 B1 | 10/2003 | Ling et al. | |
| 7,178,860 B2 | 2/2007 | Lemmons | |
| 7,232,189 B2 | 6/2007 | Covington et al. | |
| 7,338,111 B2 | 3/2008 | Lemmons | |
| 7,378,000 B2 | 5/2008 | Lemmons | |
| 7,401,844 B2 | 7/2008 | Lemmons | |
| D606,565 S | 12/2009 | Hickenbottom | |
| 7,762,617 B2 * | 7/2010 | Booher | B62D 33/046 296/184.1 |
| 7,971,926 B2 | 7/2011 | Lemmons | |
| 7,992,943 B2 | 8/2011 | Westner | |
| D654,096 S | 2/2012 | Hall | |
| 8,550,542 B1 * | 10/2013 | Booher | B62D 35/001 296/183.1 |
| 9,085,331 B1 * | 7/2015 | McWilliams | B60P 1/286 |
| 2002/0008467 A1 | 7/2002 | Kloepfer | |
| 2004/0183334 A1 * | 9/2004 | Bibeau | B60P 1/286 296/183.2 |
| 2006/0059791 A1 * | 3/2006 | Conny | B62D 25/02 52/71 |
| 2006/0237992 A1 * | 10/2006 | Lemmons | B62D 33/046 296/186.1 |
| 2007/0007759 A1 | 1/2007 | Lemmons | |
| 2007/0277696 A1 * | 12/2007 | Forbes | B61D 9/00 105/244 |
| 2008/0018135 A1 | 1/2008 | Risner | |
| 2008/0143142 A1 * | 6/2008 | Lemmons | B62D 53/06 296/186.1 |
| 2009/0021046 A1 * | 1/2009 | Goff | B62D 33/046 296/156 |
| 2009/0021047 A1 * | 1/2009 | Roush | B62D 33/04 220/675 |
| 2009/0260305 A1 * | 10/2009 | Haub | B60P 1/286 52/592.1 |
| 2011/0121610 A1 * | 5/2011 | Stanton | B62D 27/023 428/192 |
| 2013/0125491 A1 * | 5/2013 | Griffin | E04C 2/38 156/60 |
| 2015/0007436 A1 * | 1/2015 | Kibler | B60P 3/2205 29/897.2 |
| 2016/0075382 A1 * | 3/2016 | Tubbs | B62D 33/023 296/183.1 |
| 2018/0290579 A1 * | 10/2018 | Maiorana | B21D 35/006 |
| 2019/0329829 A1 * | 10/2019 | Fenton | B65D 90/026 |
| 2020/0094727 A1 * | 3/2020 | Kloepfer | B62D 63/06 |
| 2020/0114800 A1 * | 4/2020 | Kloepfer | B60P 3/2205 |
| 2020/0270054 A1 * | 8/2020 | Kloepfer | B62D 53/06 |
| 2022/0041225 A1 | 2/2022 | McWilliams | |

OTHER PUBLICATIONS

Heavy Equipment Guide, "Dump Trailer with U-frame and curved corners"; http://heg.baumpub.com/products/8977/dump-trailer-with-u-frame-and-curved-corners; May 18, 2012.

* cited by examiner

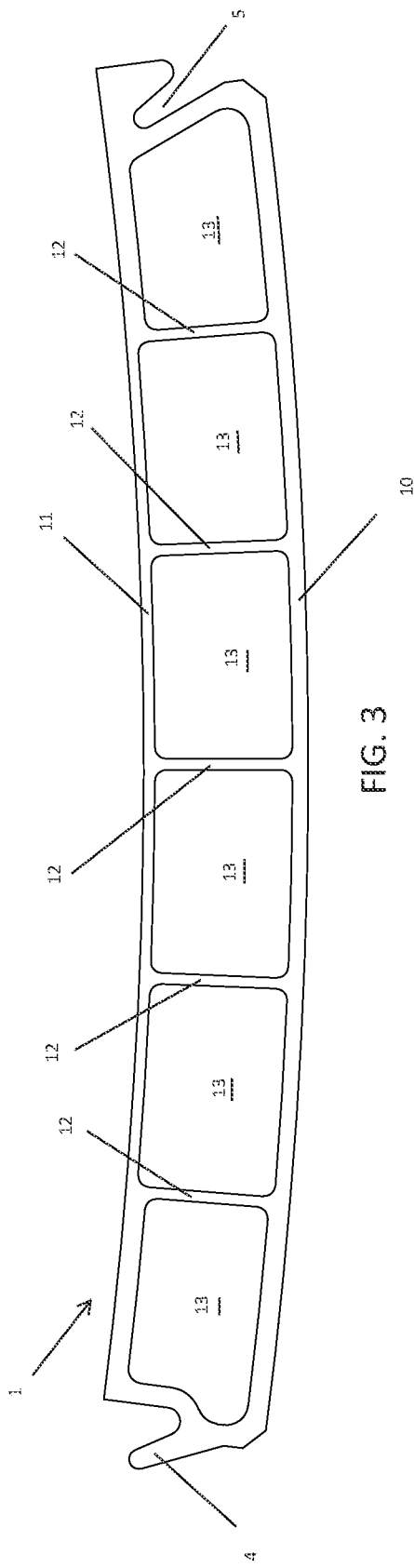

MODULAR TRAILER SYSTEM

BACKGROUND OF THE INVENTION

Cross Reference

Not Applicable.

Field of the Invention

This invention relates generally to a modular trailer system.

Description of the Related Art

Trailers that may be tilted by raising the front end and dumping the contents out of the rear end by force of gravity are well known. These trailers are typically attached to trucks or other vehicles to haul the trailer and accompanying load. The trailer itself typically includes a front wall and sidewalls and may have a removable or swinging tail gate. The tail gate is typically closed during loading and transportation of the materials and is removed or opened to unload the materials.

Trailer walls were traditionally constructed using sheet material. U.S. Pat. Nos. 7,971,926 and 7,338,111, both of which are incorporated herein by reference, attempted to improve on traditional sheet material walls by using hollow extruded panels. The panels have a double wall construction with inner and outer shells to provide increased puncture resistance, wear resistance, and strength, while remaining lightweight. In both patents, a separate top rail was attached to the top of the walls.

Such panels have to be welded to each other on both the inside and outside of the trailer, as well as to the floor and to the top rail. As such, assembly of such trailers is time consuming and costly. In addition, aluminum trailers, while lightweight, are not strong enough to haul certain loads, such as boulders.

Based on the foregoing, it is desirable to provide a modular trailer system with a curved cross section made of curved panels.

It is further desirable for adjacent panels to be capable of being attached without double welding, reducing assembly cost.

It is further desirable for the system to provide optional steel components to reinforce the trailer for certain uses.

SUMMARY OF THE INVENTION

In general, in a first aspect, the invention relates to a modular trailer system comprising a plurality of curved panels, where each panel is elongate and has a first side with an angled projection and an opposing second side with an angled slot such that the angled projection of one panel is capable of fitting into the angled slot of another panel, allowing the panels to join together to form a continuously curved surface. The plurality of curved panels may form a trailer body with an open top, where the open top is narrower than a widest point of the trailer body due to the curvature of the continuously curved surface. The modular trailer system may further comprise a first top rail with an angled slot capable of receiving the angled projection of one of the plurality of curved panels and a second top rail with an angled projection capable of fitting into the angled slot of another of the plurality of curved panels. The plurality of curved panels, first top rail, and second top rail may be assembled together to form an elongate trailer body with a partially circular cross section, such that the trailer body has a continually rounded bottom and sides and an open top.

The plurality of curved panels, first top rail, and second top rail may be joined via a weld on each joint, located on an exterior of the trailer body. The joints may not be welded on an interior of the trailer body. Alternately, the plurality of curved panels, first top rail, and second top rail may be joined via adhesive in each joint.

The plurality of curved panels may be made of extruded aluminum. The modular trailer system may further comprise a liner, which may be made of steel, UHMW, aluminum, nylon, plastic, or any other desired material. Each of the top rails may comprise an inwardly projecting lip, and the liner may be located within an interior of the trailer body and below the lips of the top rails.

BRIEF DESCRIPTION OF THE DRAWINGS

FIG. 3 is a cross-sectional view of a curved panel;

FIG. 4 is a close-up cross-sectional view of a first side of the curved panel of FIG. 3;

FIG. 5 is a close-up cross-sectional view of an opposing second side of the curved panel of FIG. 3.

Figure 1:
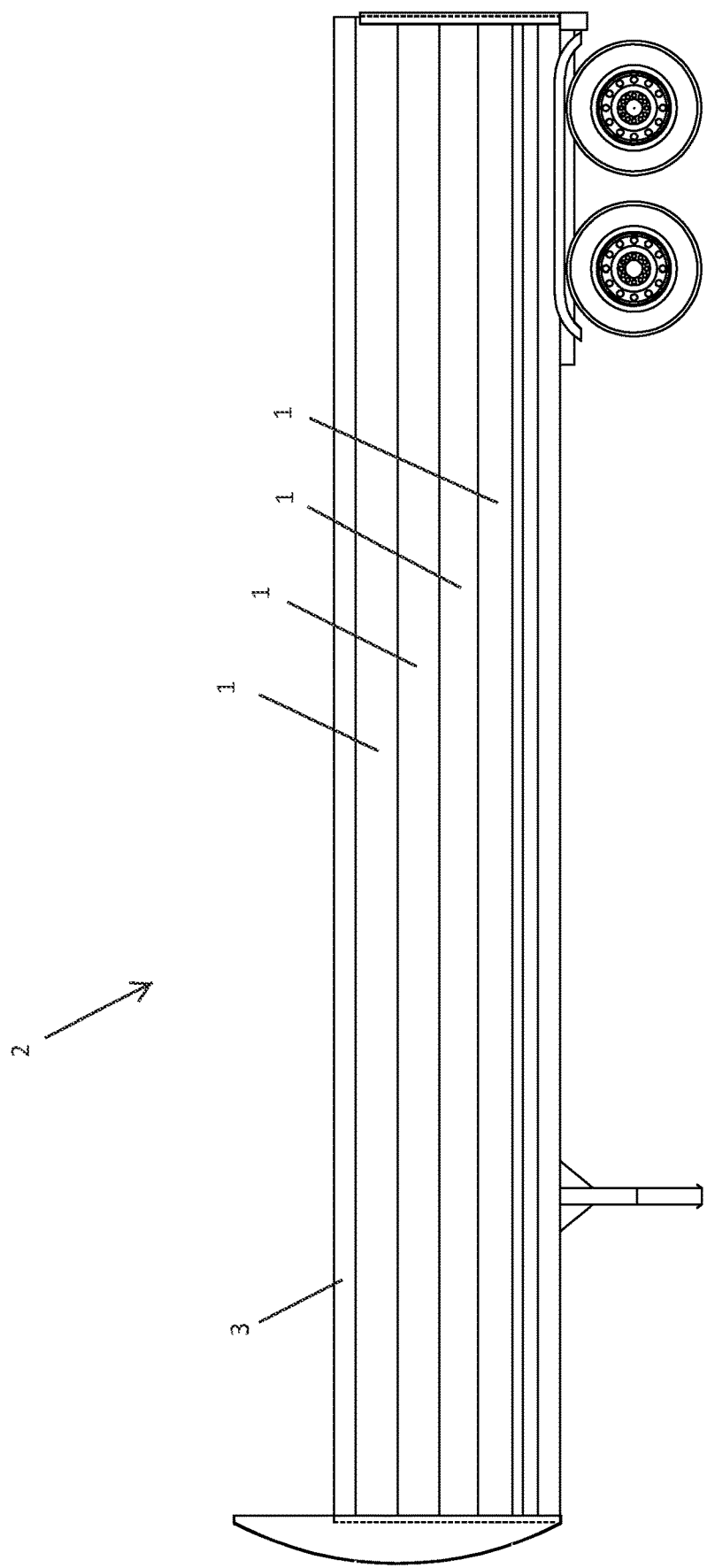
FIG. 1 is a side view of a trailer constructed using the modular trailer system of the present invention.
Figure 2:
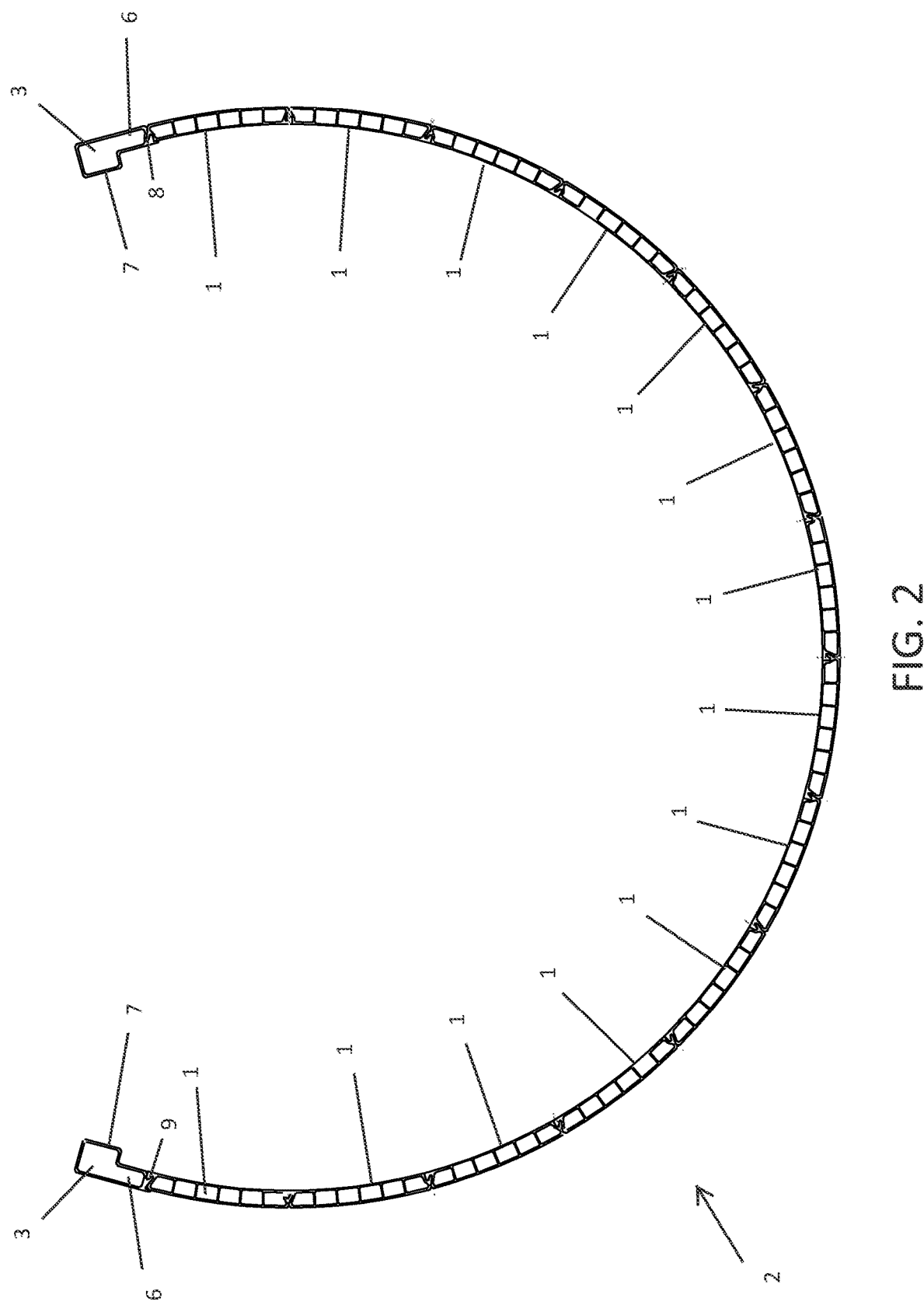
FIG. 2 is a cross-sectional view of the assembled trailer body, including a plurality of curved panels and two top rails.
Figure 6:
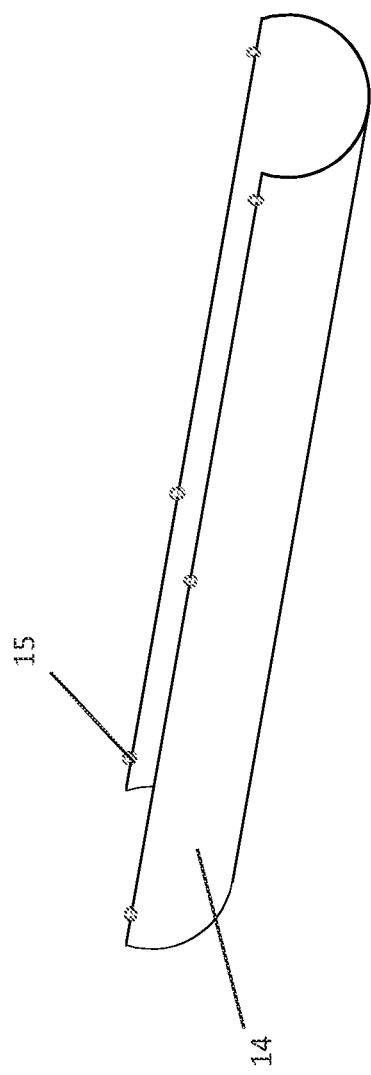
FIG. 6 is a perspective view of the liner.
Figure 7:
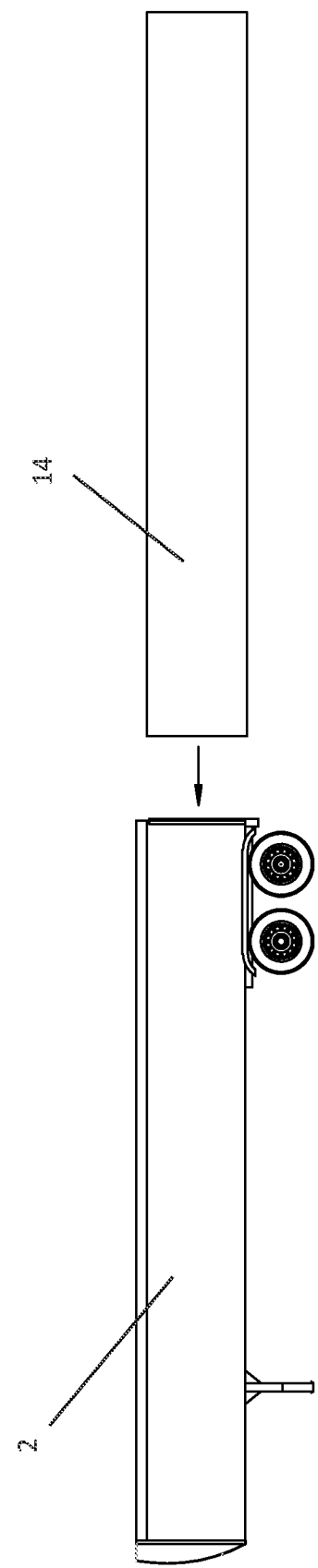
FIG. 7 is a side view of a trailer with the liner being installed.
Figure 8:
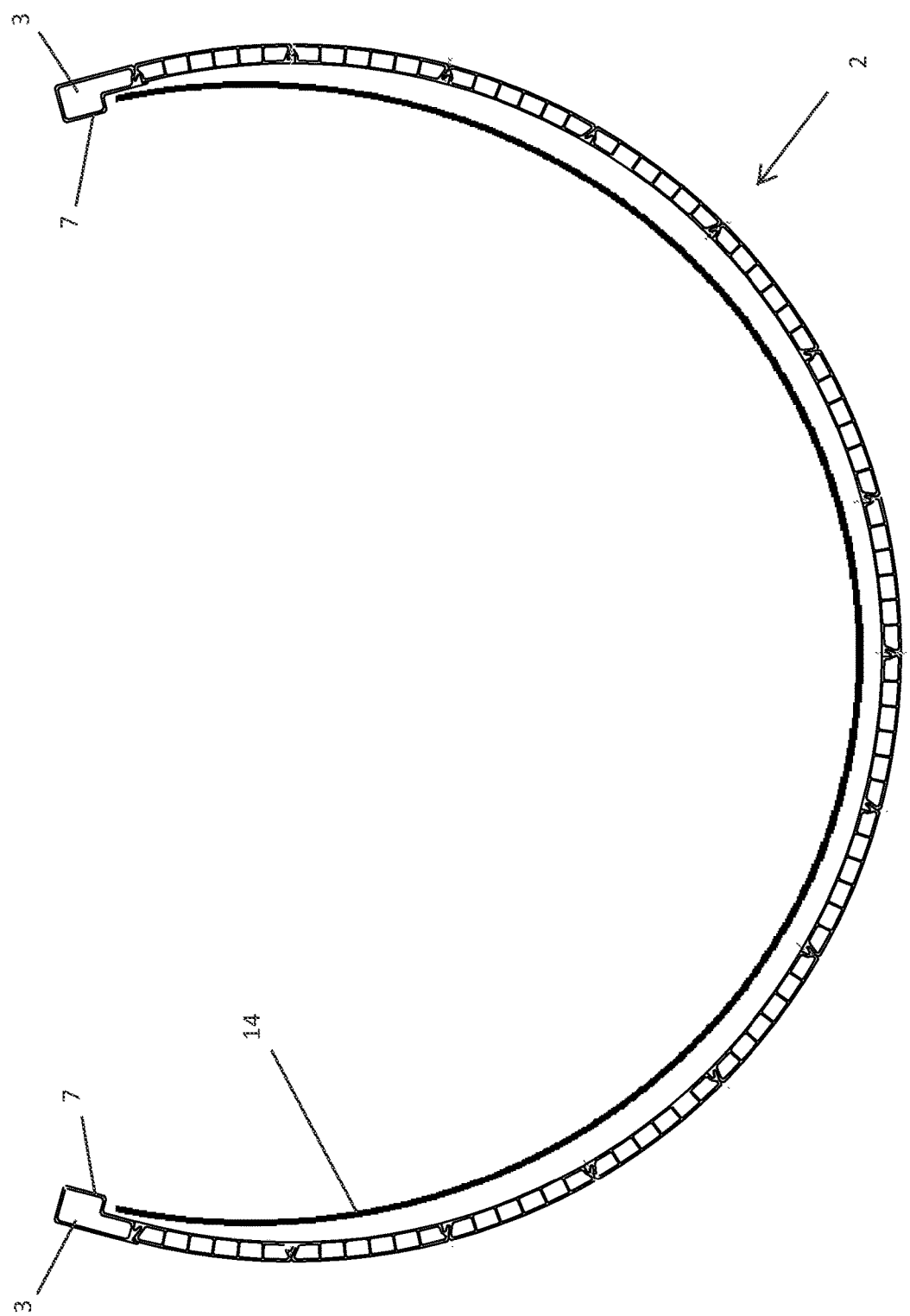
FIG. 8 is a cross-sectional view of the assembled trailer body, including a plurality of curved panels, two top rails, and a liner.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a modular trailer system. The system comprises a plurality of curved panels 1 that join together to form a curved trailer body 2. The system may further comprise top rails 3 running along each side of the top of the trailer body 2.

Each of the curved panels 1 may be horizontally elongate and may have a curved cross section. Each panel 1, when viewed from an end with the sides curving up, may have a first side with an upwardly angled projection 4 and an opposing second side with an upwardly angled slot 5. The upwardly angled projection 4 of one panel 1 may fit into the upwardly angled slot 5 of another panel 1, allowing the panels to join together to form a continuously curved surface. As such, multiple curved panels 1 may form the trailer body 2, which may have a partial circular cross section. In other words, theoretically, if enough panels 1 were joined, the trailer body 2 would may have a circular cross section; the trailer body 2, however, may have an open top, allowing access to the interior of the trailer body 2 and making the cross section a partial circle. Thus, the tops of the sides of the trailer body 2 may curve inward, with the opening at the top of the trailer body 2 narrower than the widest point of the trailer body 2. Thus, the trailer body 2 may be self-centering. In addition, the inward curve may strengthen the trailer body 2 and prevent the sides from spreading, as is typical in straight-sided trailers. The trailer body 2 may have any desired height, depending on how many panels 1 are used to form the body 2. Thus, the yardage of the trailer body 2 may be increased by adding panels 1. Alternately, the trailer body 2 may have a closed top for central loading of material.

The curved panels 1 may curve at any desired rate. For example, the curved panels 1 may curve such that the assembled trailer body 2 has a diameter of 72 inches to 101 inches, or any other desired diameter.

A top rail 3 may fit atop each of the top edges of the trailer body 2. Each top rail 3 may be elongate and may have an inverted L-shaped cross section, with a generally downward pointing leg 6 and a lip 7, with the lip 7 projecting perpendicularly relative to the leg 6. When in place on the trailer body 2, the lip 7 may point inward, rather than outward as is typical with top rails. There may be two types of top rail 3: one with an upwardly angled slot 8 at the distal end of the leg 6, and one with an upwardly angled projection 9 at the distal end of the leg 6, where upwardly for each is when viewed with the top rail 3 lying on its back, with the lip 7 projecting vertically. The upwardly angled slot 8 may join with the upwardly angled projection 4 along the top edge on one side of the trailer body 2, while the upwardly angled projection 9 may join with the upwardly angled slot 5 along the top edge on the other side of the trailer body 2. The top rails 3 may function to lock the panels 1 into place.

The curved panels 1 may be made of extruded aluminum alloy or any other desired material. The curved panels 1 may have a double wall design. Specifically, each curved panel 1 may have an outer shell 10 and an inner shell 11 connected by webs 12, thus forming a plurality of cavities or voids 13. The cavities or voids 13 may optionally be filled with fiber or other desired fill.

During assembly, the trailer body 2 may be assembled on a jig. A top rail 3 with an upwardly angled slot 8 may be placed, and a curved panel 1 may be joined thereto, such as by sliding the upwardly angled projection 4 of the panel 1 into the upwardly angled slot 8 of the top rail 3. The panel 1 may be welded to the top rail 3 along their joint. If the joint is welded, it may be welded only on the outside of the trailer body 2, without a corresponding weld on the interior of the trailer body 2. Alternately, the panel 1 may be secured to the top rail 3 by an alternative attachment device. For example, adhesive may be placed within the joint, and the weld may be omitted. Next, another curved panel 1 may be added by placing the upwardly angled projection 4 of the second panel 1 into the upwardly angled slot 5 of the first panel 1. The joint may be secured, such as via a weld, adhesive, or any other desired attachment device, as described above. The process may be repeated with additional curved panels 1 until the desired dimensions are reached. A top rail 3 with an upwardly angled projection 9 may be joined to the last curved panel 1 by sliding the upwardly angled projection 9 of the top rail 3 into the upwardly angled slot 5 of the last curved panel 1. The joint may be secured, such as via a weld, adhesive, or any other desired attachment device, as described above.

The modular trailer system may further comprise a liner 14. The liner 14 may be made of steel, UHMW, aluminum, nylon, plastic, or any other desired material. For example, the liner 14 may be made of a sheet of steel ¼ inch to ⁵⁄₁₆ inch thick, or any other desired thickness. The liner 14 may be rock resistant, and as such may allow the user to haul boulders in the trailer, despite the trailer body being made of aluminum. The liner 14 may be located within the trailer body 2, and may run the entire length of the trailer body 2 or only part of the length of the trailer body 2, as desired. For example, a trailer may be a combo trailer comprising an aluminum trailer body 2 and a steel back, where the aluminum trailer body 2 is unlined for its front 6 feet and lined with a steel liner 14 for its remaining length, with the steel back extending the final 10 feet of the trailer and attached to the trailer body 2, such as via huck bolts. Alternately, the trailer body 2 and its liner 14 may run the entire length of the trailer, from the hoist box to the end; the trailer may have a steel front section before the trailer body 2 and/or a steel back section after the trailer body 2; or any other desired configuration.

During assembly, the liner 14 may comprise one or more sheets of steel that are rolled. If the liner 14 comprises more than one sheet, adjacent sheets may be welded along their seems to form a unitary liner 14. The liner 14 may have a plurality of rings 15 attached along its edges, allowing the liner 14 to be lifted with a crane and dropped into the trailer body 2 under tension. Once released, the liner 14 may tend to bow outward, nestling under the lips 7 of the top rails 3.

Whereas, the devices and methods have been described in relation to the drawings and claims, it should be understood that other and further modifications, apart from those shown or suggested herein, may be made within the spirit and scope of this invention.

What is claimed is:

1. A modular trailer system comprising:
   a plurality of curved panels, where each panel is elongate and has a first side with an angled projection and an opposing second side with an angled slot such that the angled projection of one panel is capable of fitting into the angled slot of another panel, allowing the panels to join together to form a continuously curved surface, where the plurality of curved panels form a trailer body with an open top, where the open top is narrower than a widest point of the trailer body due to the curvature of the continuously curved surface.

2. The modular trailer system of claim 1 where the plurality of curved panels are made of extruded aluminum.

3. A modular trailer system comprising:
   a plurality of curved panels, where each panel is elongate and has a first side with an angled projection and an opposing second side with an angled slot such that the angled projection of one panel is capable of fitting into the angled slot of another panel, allowing the panels to join together to form a continuously curved surface;
   a first top rail with an angled slot capable of receiving the angled projection of one of the plurality of curved panels; and
   a second top rail with an angled projection capable of fitting into the angled slot of one of the plurality of curved panels.

4. The modular trailer system of claim 3 where the plurality of curved panels, first top rail, and second top rail are assembled together to form an elongate trailer body with a partially circular cross section, such that the trailer body has a continually rounded bottom and sides and an open top.

5. The modular trailer system of claim 4 where the plurality of curved panels, first top rail, and second top rail are joined via a weld on each joint, located on an exterior of the trailer body.

6. The modular trailer system of claim 5 where the joints are not welded on an interior of the trailer body.

7. The modular trailer system of claim 4 where the plurality of curved panels, first top rail, and second top rail are joined via adhesive in each joint.

8. The modular trailer system of claim 4 further comprising a liner.

9. The modular trailer system of claim 8 where the liner is made of steel.

10. The modular trailer system of claim 8 where each of the top rails comprises an inwardly projecting lip and where the liner is located within an interior of the trailer body and below the lips of the top rails.

* * * * *